(12) United States Patent
Sohn et al.

(10) Patent No.: US 9,711,763 B2
(45) Date of Patent: Jul. 18, 2017

(54) FLEXIBLE SECONDARY BATTERY

(71) Applicant: SAMSUNG SDI CO., LTD., Yongin-si, Gyeonggi-do (KR)

(72) Inventors: Juhee Sohn, Yongin-si (KR); Junwon Suh, Yongin-si (KR); Jeong-Doo Yi, Yongin-si (KR); Hyunhwa Song, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 142 days.

(21) Appl. No.: 14/675,851

(22) Filed: Apr. 1, 2015

(65) Prior Publication Data
US 2016/0006070 A1 Jan. 7, 2016

(30) Foreign Application Priority Data

Jul. 2, 2014 (KR) .................. 10-2014-0082526

(51) Int. Cl.
*H01M 2/08* (2006.01)
*H01M 2/26* (2006.01)
*H01M 10/04* (2006.01)

(52) U.S. Cl.
CPC .............. *H01M 2/08* (2013.01); *H01M 2/26* (2013.01); *H01M 10/0436* (2013.01); *H01M 2220/30* (2013.01)

(58) Field of Classification Search
CPC ...... H01M 2/08; H01M 2/06; H01M 10/0436; H01M 2220/30; H01M 2/26
See application file for complete search history.

(56) References Cited

U.S. PATENT DOCUMENTS

2005/0089753 A1* 4/2005 Yoon ............... H01M 2/0285
                                                     429/180
2010/0173194 A1* 7/2010 Fujiya ............... H01M 2/0212
                                                     429/178

(Continued)

FOREIGN PATENT DOCUMENTS

JP       2005-332608 A     12/2005
JP       2013-145678 A      7/2013

(Continued)

OTHER PUBLICATIONS

Hawley's Condensed Chemical Dictionary (Electrode entry: {http://onlinelibrary.wiley.com/doi/10.1002/9780470114735.hawley06418/full} Online published Mar. 15, 2007).*

*Primary Examiner* — Patrick Ryan
*Assistant Examiner* — Aaron Greso
(74) *Attorney, Agent, or Firm* — Lee & Morse P.C.

(57) ABSTRACT

A flexible secondary battery includes an electrode assembly including a stack having a first electrode plate, a second electrode plate, and a separator between the first and second electrode plates, and a fixing member fixing a first end portion of the stack, a first electrode tab and a second electrode tab connected to the first electrode plate and the second electrode plate, respectively, and a molding member surrounding a first end portion of the electrode assembly including the fixing member, and a connection region between the electrode assembly and the first and second electrode tabs, wherein positional variations of a second end portion of the electrode assembly are relatively large as compared to positional variations of the first end portion of the electrode assembly.

20 Claims, 6 Drawing Sheets

(56) References Cited

U.S. PATENT DOCUMENTS

2012/0121957 A1* 5/2012 Kwon .................. H01M 2/204
 429/99
2014/0079979 A1 3/2014 Kwon et al.

FOREIGN PATENT DOCUMENTS

KR 100804411 * 2/2008 ........... Y02E 60/122
KR 10-2014-0035689 A 3/2014

* cited by examiner

FLEXIBLE SECONDARY BATTERY

CROSS-REFERENCE TO RELATED APPLICATION

Korean Patent Application No. 10-2014-0082526, filed on Jul. 2, 2014, in the Korean Intellectual Property Office, and entitled: "Flexible Secondary Battery," is incorporated by reference herein in its entirety.

BACKGROUND

1. Field

One or more embodiments relate to a flexible secondary battery.

2. Description of the Related Art

Along with the development of electronics, not only markets for cellular phones, portable multimedia players (PMPs), and mpeg audio layer-3 (MP3) players, but also markets for other various portable electronic devices, e.g., smartphones, smart pads, electronic book readers, flexible tablet computers, and portable medical devices attachable to the human body, have markedly grown. The growth of markets for such portable electronic devices has increased the demand for batteries suitable for operating such portable electronic devices. In addition, such portable electronic devices are increasingly required to be flexible in view of durability during transportation, storage, and impact, and thus the demand for flexible batteries has also increased.

SUMMARY

According to one or more embodiments, a flexible secondary battery includes an electrode assembly including a stack having a first electrode plate, a second electrode plate, and a separator between the first and second electrode plates, and a fixing member fixing a first end portion of the stack, a first electrode tab and a second electrode tab connected to the first electrode plate and the second electrode plate, respectively, and a molding member surrounding a first end portion of the electrode assembly including the fixing member, and a connection region between the electrode assembly and the first and second electrode tabs, wherein positional variations of a second end portion of the electrode assembly are relatively large as compared to positional variations of the first end portion of the electrode assembly.

The molding member may have flexibility.

The molding member may include resin.

The flexible secondary battery may further include: a gasket surrounding edges of the electrode assembly and including opened first and second surfaces; a first sealing sheet attached to the first surface of the gasket; and a second sealing sheet attached to the second surface of the gasket that is opposite the first surface.

Each of the first and second sealing sheets may include a first insulation layer, a metal layer, and a second insulation layer, wherein the first insulation layers may make contact with the gasket, and the gasket and the first insulation layers may be formed of the same material.

The molding member may be disposed in the gasket.

The fixing member may be adjacent to the first and second electrode tabs.

The first electrode plate may include a first active material coating portion formed by coating a first metal collector with a first active material, and a first non-coating portion which is a region of the first metal collector that is not coated with the first active material, wherein the first electrode tab may be attached to the first non-coating portion. The second electrode plate may include a second active material coating portion formed by coating a second metal collector with a second active material, and a second non-coating portion which is a region of the second metal collector that is not coated with the second active material, wherein the second electrode tab may be attached to the second non-coating portion.

The first non-coating portion may include a first connection region to which the first electrode tab is attached, and a first boundary region on which the fixing member is disposed. The second non-coating portion may include a second connection region to which the second electrode tab is attached, and a second boundary region on which the fixing member is disposed.

The fixing member, the first electrode tab, and the second electrode tab may be at a same side of the electrode assembly.

The molding member may continuously overlap the fixing member, the first electrode tab, and the second electrode tab.

The molding member and the fixing member may be at a same side of the electrode assembly.

The fixing member, the first electrode tab, and the second electrode tab may be only at a single side of the electrode assembly.

The molding member may continuously overlap the fixing member and a contact region between the first and second electrode tabs and corresponding portions of the electrode assembly.

Edges of the first electrode plate, the second electrode plate, and the separator may be aligned in the first end portion of the stack, the fixing member maintaining the edges stationary.

Edges of the first electrode plate, the second electrode plate, and the separator in a second end portion of the stack may be spaced apart from each other when the secondary battery is bent, the first and second end portions of the stack being opposite each other.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
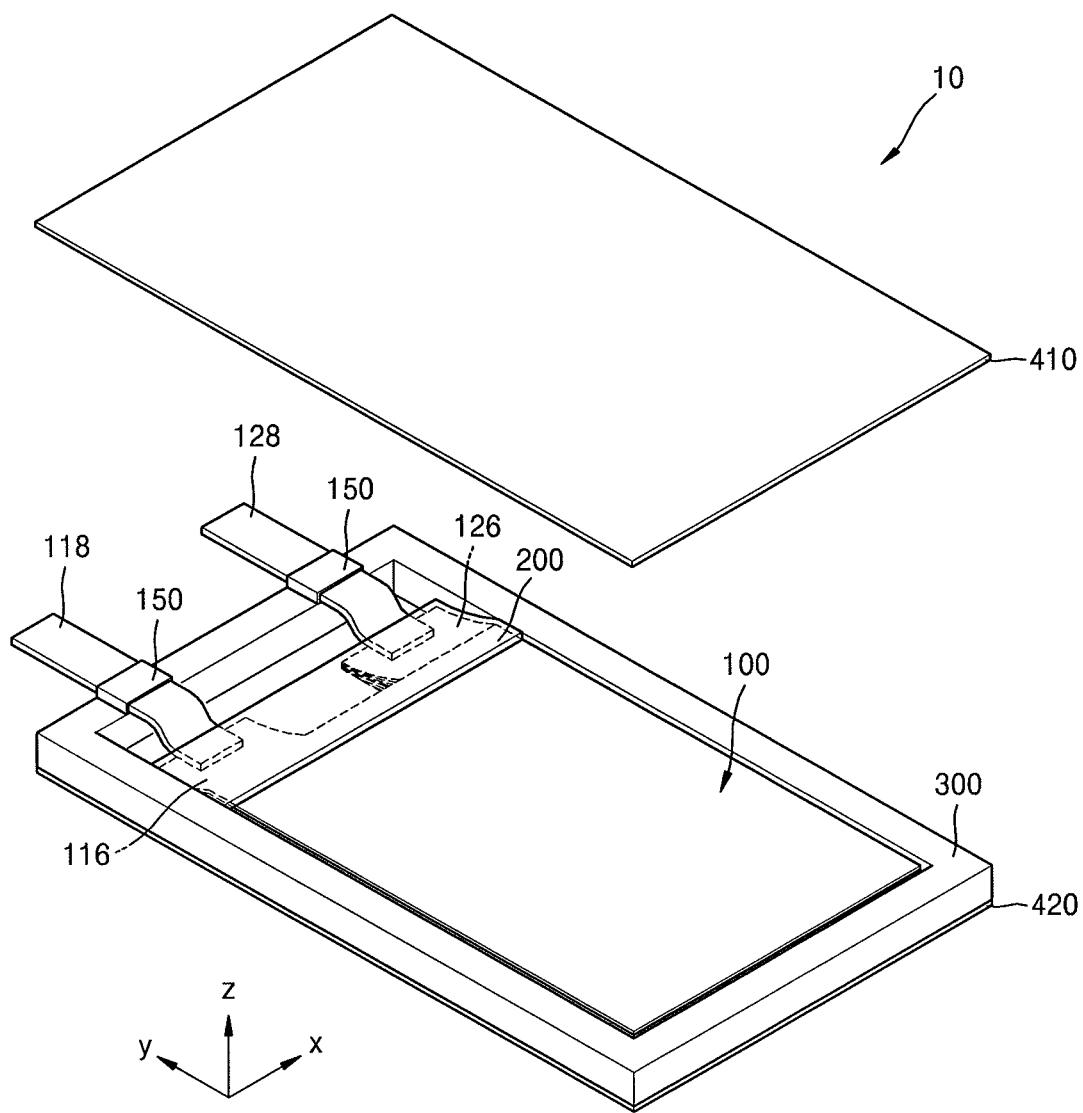
FIG. 1 illustrates a schematic exploded perspective view of a flexible secondary battery according to an embodiment.

Reference will now be made in detail to embodiments, examples of which are illustrated in the accompanying drawings. Effects and features of the embodiments, and implementation methods thereof will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments will be described in detail with reference to the accompanying drawings. In the drawings, like reference numerals denote like elements, and overlapping descriptions thereof will be omitted.

In the following descriptions of the embodiments, although the terms "first" and "second" are used to describe various elements, these elements should not be limited by these terms. These terms are only used to distinguish one element from another element. Further, in the following descriptions of the embodiments, the terms of a singular form may include plural forms unless referred to the contrary.

In the following descriptions of the embodiments, the meaning of "include," "comprise," "including," or "comprising" specifies a property, a region, a fixed number, a step, a process, an element, a component, and a combination thereof but does not exclude other properties, regions, fixed numbers, steps, processes, elements, components, and combinations thereof. In addition, it will be understood that when a film, a region, or an element is referred to as being "above" or "on" another film, region, or element, it can be directly on the other film, region, or element, or intervening films, regions, or elements may also be present.

In the drawings, the sizes of elements may be exaggerated for clarity. For example, in the drawings, the size or thickness of each element may be shown for illustrative purposes, and thus the embodiments should not be construed as being limited thereto.

Figure 2:
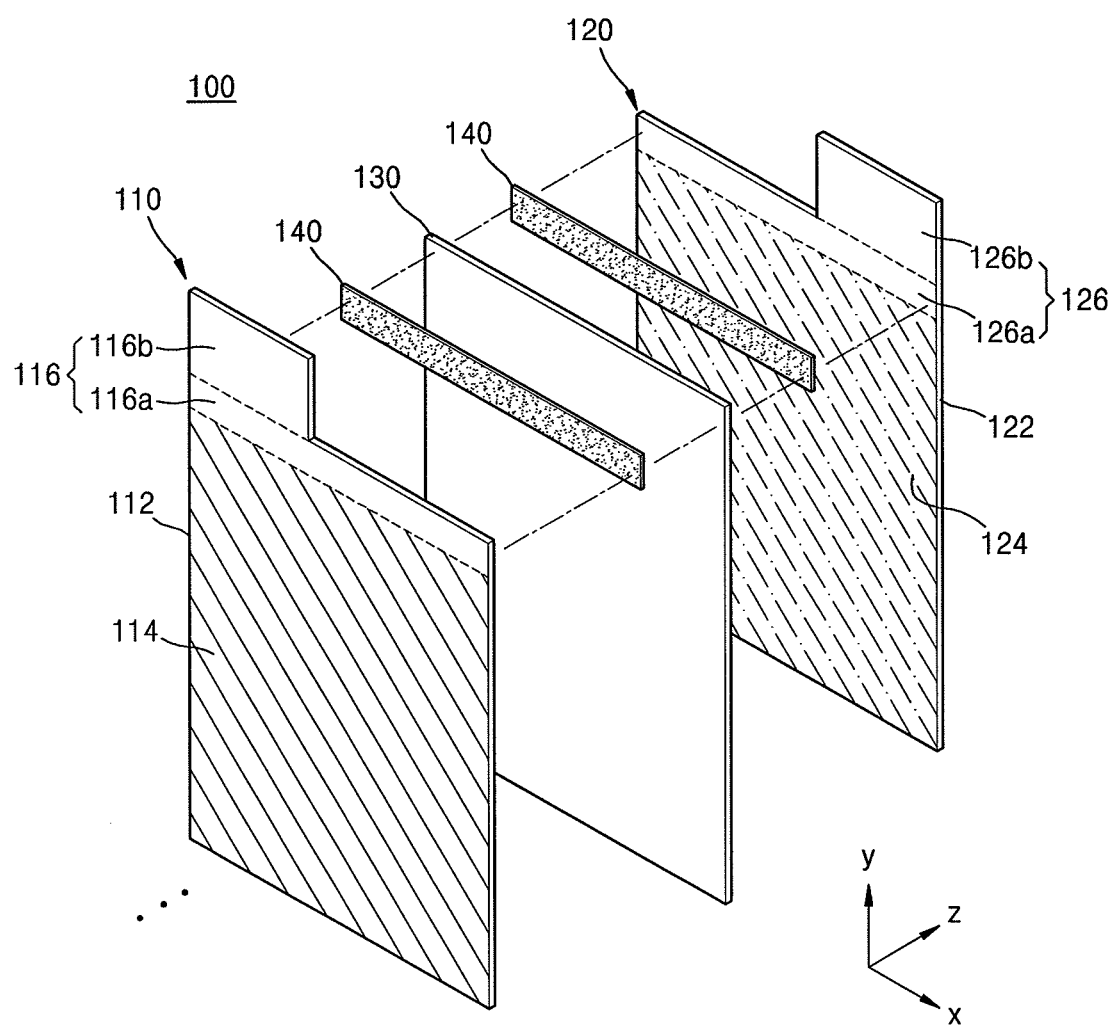
FIG. 2 illustrates a schematic exploded perspective view of a first electrode plate, a second electrode plate, a separator, and fixing members of an electrode assembly of a flexible secondary battery according to an embodiment.
Figure 3:
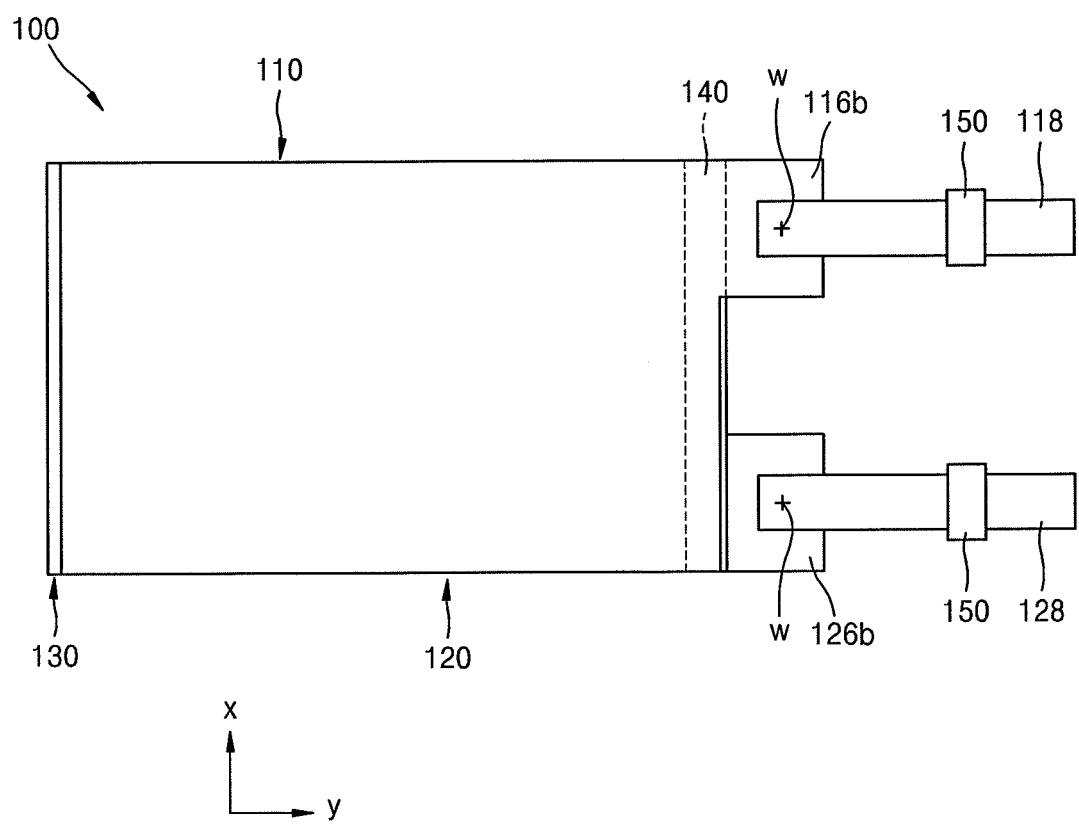
FIG. 3 illustrates a schematic plan view of an electrode assembly of z flexible secondary battery according to an embodiment.
Figure 4:
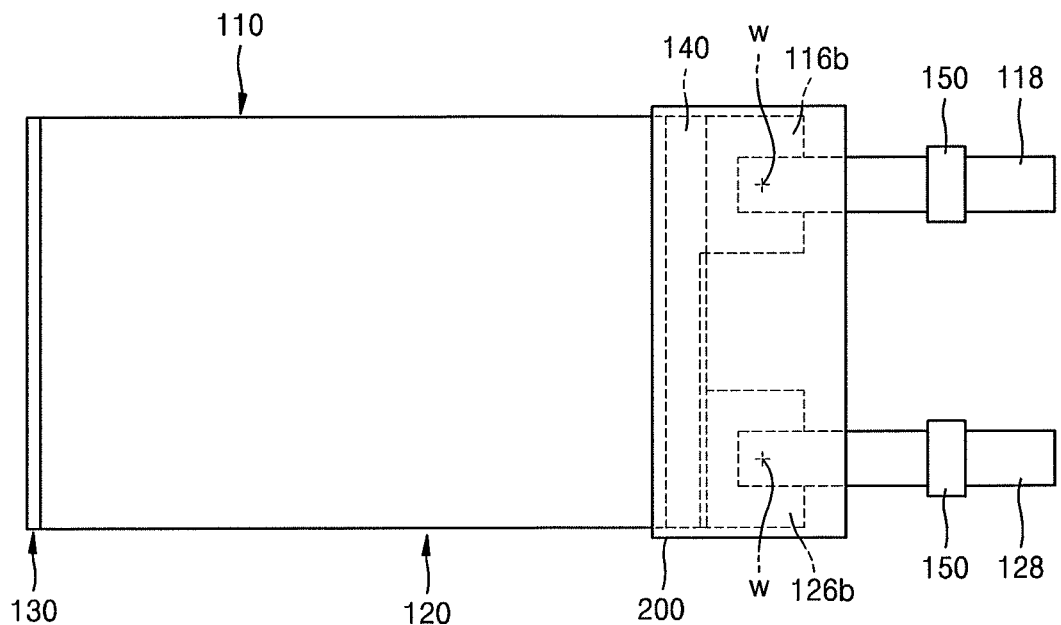
FIG. 4 illustrates a schematic plan view of an electrode assembly and a molding member of a flexible secondary battery according to an embodiment.
Figure 5:
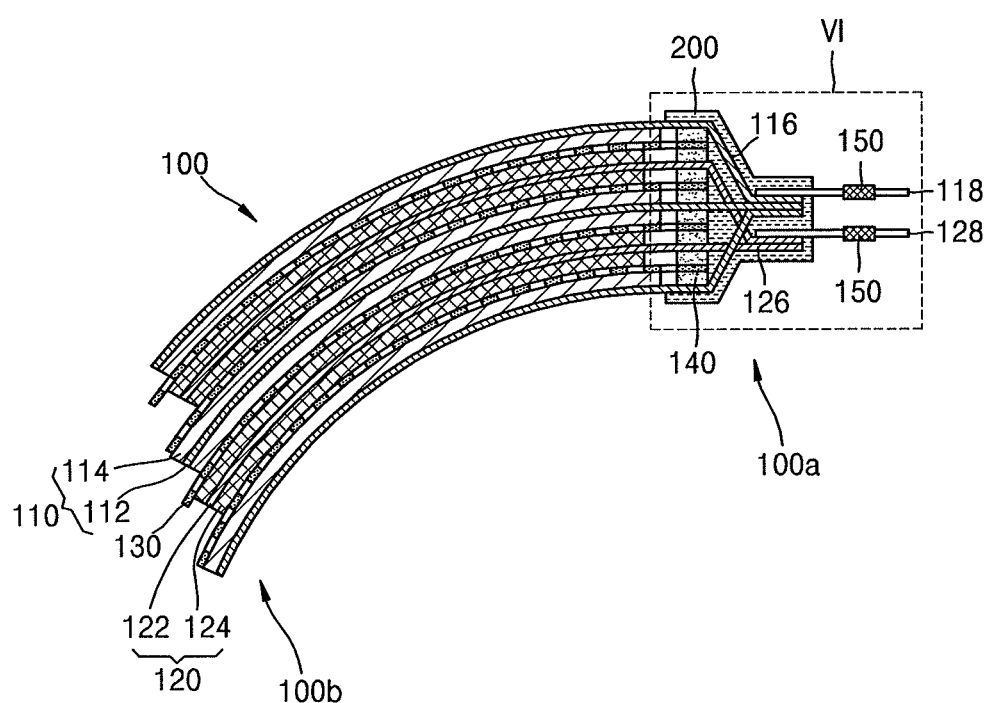
FIG. 5 illustrates a view of a coupled structure of an electrode assembly and a molding member of a flexible secondary battery according to an embodiment.
Figure 6:
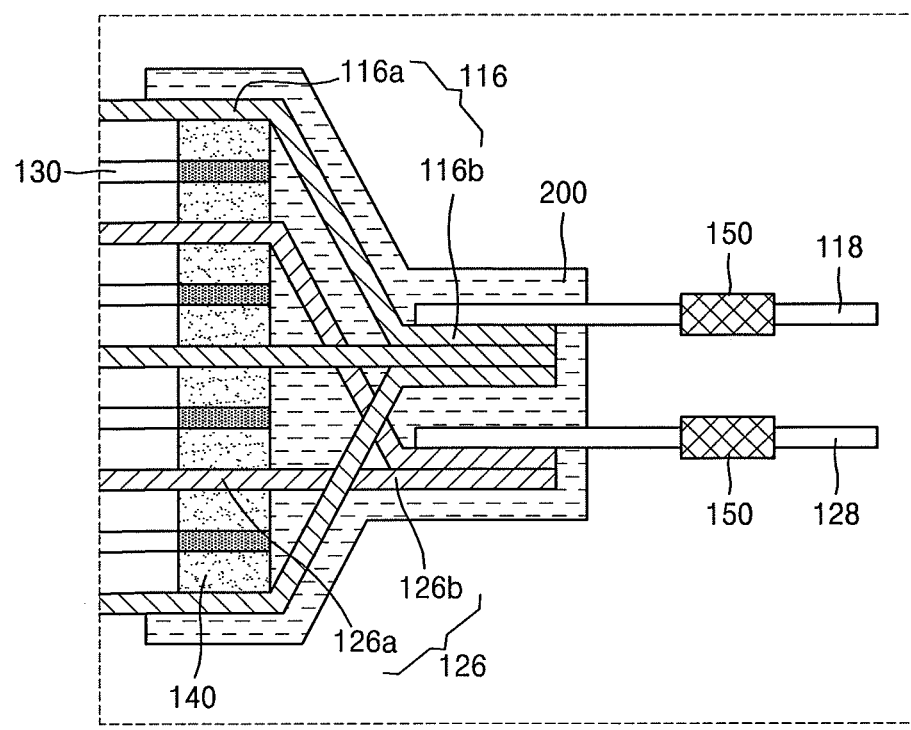
FIG. 6 illustrates an enlarged view of portion VI of FIG. 5.

FIG. 1 is a schematic exploded plan view of a flexible secondary battery 10 according to an embodiment, and FIG. 2 is a schematic exploded perspective view of a first electrode plate 110, a second electrode plate 120, a separator 130, and fixing members 140 of the flexible secondary battery 10. FIG. 3 is a schematic plan view of an electrode assembly 100 of the flexible secondary battery 10, FIG. 4 is a schematic plan view of the electrode assembly 100 with a molding member 200, FIG. 5 is a view of a coupled structure of the electrode assembly 100 and the molding member 200, and FIG. 6 is an enlarged view of portion VI of FIG. 5.

Referring to FIG. 1, the flexible secondary battery 10 of the embodiment may include the electrode assembly 100, the molding member 200, a gasket 300, and first and second sealing sheets 410 and 420. For example, as illustrated in FIG. 1, the gasket 300 may be positioned to connect between the first and second sealing sheets 410 and 420, so the electrode assembly 100 may be positioned in an opening defined by the gasket 300 with the first and second sealing sheets 410 and 420.

Referring to FIG. 2, the electrode assembly 100 may include the first electrode plate 110, the second electrode plate 120, and the separator 130 between the first and second electrode plates 110 and 120. A stack may be formed by repeatedly stacking a plurality of first electrode plates 110, a plurality of second electrode plates 120, and a plurality of separators 130 disposed therebetween. For example, the first electrode plate 110, the second electrode plate 120, and the separator 130 may be stacked to define the electrode assembly 100 with the plan view of FIG. 3, and such a stack may be positioned in the opening defined by the gasket 300 with the first and second sealing sheets 410 and 420 (FIG. 1).

As further illustrated in FIG. 2, the first electrode plate 110 may include a first metal collector 112, a first active material coating portion 114 formed by coating the first metal collector 112 with a first active material, and a first non-coating portion 116 which is a portion of the first metal collector 112 that is not coated with the first active material. The first non-coating portion 116 may include a first boundary region 116a having the same width as that of the first active material coating portion 114 and adjoining the first active material coating portion 114, and a first connection region 116b extending from the first boundary region 116a in a first direction, e.g., along the y-axis, and having a smaller width than that of the first boundary region 116a, e.g., along the x-axis.

The second electrode plate 120 may include a second metal collector 122, a second active material coating portion 124 formed by coating the second metal collector 122 with a second active material, and a second non-coating portion 126 which is a portion of the second metal collector 122 not coated with the second active material. The second non-coating portion 126 may include a second boundary region 126a having the same width as that of the second active material coating portion 124 and adjoining the second active material coating portion 124, and a second connection region 126b extending from the second boundary region 126a in the first direction and having a smaller width than that of the second boundary region 126a.

The first and second non-coating portions 116 and 126 may extend in the same direction. For example, the first connection region 116b of the first non-coating portion 116 and the second connection region 126b of the second non-coating portion 126 may extend from the stack in the first direction, e.g., along the y-axis.

If the first electrode plate 110 is a positive electrode plate, the first metal collector 112 may be a positive electrode collector, and the first active material coating portion 114 may be a positive electrode active material coating portion. If the second electrode plate 120 is a negative electrode plate, the second metal collector 122 may be a negative electrode collector, and the second active material coating portion 124 may be a negative electrode active material coating portion.

The positive electrode collector may include at least one metal, e.g., aluminum, stainless steel, titanium, silver, or a combination thereof. The positive electrode active material coating portion may include a positive electrode active material, a binder, and a conducting agent. The positive electrode active material may be a material capable of reversibly intercalating and deintercalating lithium ions.

For example, the positive electrode active material includes at least one of lithium transition metal oxides, e.g., lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate, nickel sulfides, copper sulfides, sulfur, iron oxides, and vanadium oxides.

The binder may include at least one of polyvinylidene fluoride-containing binders, e.g., polyvinylidene fluoride, vinylidene fluoride/hexafluoropropylene copolymer, and vinylidene fluoride/tetrafluroethylene copolymer, carboxymethyl cellulose-containing binders, e.g., sodium-carboxymethyl cellulose and lithium-carboxymethyl cellulose, acrylate-containing binders, e.g., polyacrylic acid, lithium-polyacrylic acid, acrylic, polyacrylonitrile, polymethyl methacrylate, and poly(butyl acrylate), polyamide-imides, polytetrafluoroethylene, polyethylene oxide, polypyrrole, lithium-Nafion, and styrene butadiene rubber-containing polymers.

The conducting agent may include at least one material of carbon-containing conducting agents, e.g., carbon black, carbon fiber, and graphite, conductive fiber, e.g., metal fiber, metal powder, e.g., carbon fluoride powder, aluminum powder, and nickel powder, conductive whisker, e.g., zinc oxides and potassium titanate, conductive metal oxides, e.g., titanium oxides, and conductive polymers, e.g., polyphenylene derivatives.

The negative electrode collector may include at least one metal, e.g., copper, stainless steel, nickel, and titanium. The negative electrode active material coating portion may include a negative electrode active material, a binder, and a conducting agent. The negative electrode active material may be a material capable of forming an alloy together with lithium or capable of reversibly intercalating and deintercalating lithium. For example, the negative electrode active material may include at least one of metals, carbon-containing materials, metal oxides, and lithium metal nitrides.

The metals may include at least one of, e.g., lithium, silicon, magnesium, calcium, aluminum, germanium, tin, lead, arsenic, antimony, bismuth, silver, gold, zinc, cadmium, mercury, copper, iron, nickel, cobalt, and indium.

The carbon-containing materials may include at least one of, e.g., graphite, graphite carbon fiber, coke, mesocarbon microbeads (MCMBs), polyacene, pitch-derived carbon fiber, and hard carbon.

The metal oxides may include at least one of, e.g., lithium titanium oxides, titanium oxides, molybdenum oxides, niobium oxides, iron oxides, tungsten oxides, tin oxides, amorphous tin oxide composites, silicon monoxide, cobalt oxides, and nickel oxides.

The binder and the conducting agent may be the same as the binder and the conducting agent included in the positive electrode active material.

For example, the separator 130 may be formed by coating a base film with a copolymer of polyvinylidene fluoride and hexafluoro propylene (PVDF-HFP copolymer). The base film may be at least one of co-polymers of polyethylene (PE), polystyrene (PS), polypropylene (PP) and polyethylene (PE), and polypropylene (PP). However, the separator 130 is not limited thereto.

It has been described above that the first electrode plate 110 is a positive electrode plate, and the second electrode plate 120 is a negative electrode plate. However, the embodiments are not limited thereto. In another embodiment, the first electrode plate 110 may be a negative electrode plate, and the second electrode plate 120 may be a positive electrode plate.

Referring back to FIG. 2, the fixing members 140 may be disposed at a first end portion of the stack of the electrode assembly 100. That is, as illustrated in FIG. 3, the fixing members 140 may be at a first end portion 100a of the electrode assembly 100 adjacent to first and second electrode tabs 118 and 128. In other words, the fixing members 140, the first electrode tab 118, and the second electrode tab 128 are all at the same end portion of the electrode assembly 100.

The fixing members 140 fix only end portions of the first electrode plate 110, the separator 130, and the second electrode plate 120 at one end portion of the electrode assembly 100. Therefore, as shown in FIG. 5, when the fixing members 140 fix the first electrode plate 110, the separator 130, and the second electrode plate 120 at the first end portion 100a of the electrode assembly 100, in a region in which the fixing members 140 are not formed, e.g., a second end portion 100b of the electrode assembly 100, the first electrode plate 110, the separator 130, and the second electrode plate 120 of the electrode assembly 100 are bendable through slippage therebetween. For example, as illustrated in FIG. 5, while edges of the first electrode plate 110, the separator 130, and the second electrode plate 120 of the electrode assembly 100 are aligned, e.g., along the z-axis, by the fixing members 140 in the first end portion 100a, edges of the first electrode plate 110, the separator 130, and the second electrode plate 120 are spaced apart from each other, e.g., along both the z-axis and the y-axis, in the second end portion 100b due to bending. Even when the electrode assembly 100 is repeatedly bent, relative positions of the first electrode plate 110, the separator 130, and the second electrode plate 120 may be maintained by the fixing members 140.

Referring to FIGS. 1 and 3, the first electrode tab 118 may be connected to a plurality of first non-coating portions 116, and the second electrode tab 128 may be connected to a plurality of second non-coating portions 126. Thus, the first electrode tab 118 and the second electrode tab 128 may substantially function as fixing parts for fixing the first electrode plates 110 and the second electrode plates 120. As such, the first electrode tab 118, the second electrode tab 128, and the fixing members 140 fix same ends of the first electrode plates 110 and the second electrode plates 120.

In contrast, if the fixing members 140 were to be disposed on the other end portion of the electrode assembly 100, i.e., an end portion opposite the first and second electrode tabs 118 and 128, both end portions of the electrode assembly 100, e.g., both end portions of the stack, would have been fixed. In this case, when an electrode assembly is bent, while both opposite end portions are fixed, the first and second electrode plates 110 and 120 may be internally bent at positions corresponding to a non-fixed center region of the stack. Further, the fixing members 140 may break to result in misalignment between the first and second electrode plates 110 and 120, and the separator 130, and in separation and electrical disconnection of the first and second electrode tabs 118 and 128 from the electrode assembly 100, e.g., the stack.

Referring back to FIG. 2, for example, the fixing members 140 may be formed of an adhesive or may be a tape coated with an adhesive. For example, as shown in FIG. 2, a first fixing member 140 may be disposed in a region between the first electrode plate 110 and the separator 130, and a second fixing member 140 may be disposed in a region between the separator 130 and the second electrode plate 120. As such, when the first and second electrode plates 110 and 120 and the separator 130 are stacked, the fixing members 140 may be within the resultant stack, so end portions of the first and second electrode plates 110 and 120 and the separator 130 that form the stack may be coupled to each other and fixed to each other through the fixing members 140.

The fixing members 140 may be adjacent to a boundary between the first active material coating portion 114 and the first non-coating portion 116 of the first electrode plate 110, and to a boundary between the first active material coating portion 124 and the second non-coating portion 126 of the second electrode plate 120. In more detail, the fixing members 140 may be disposed on, e.g., to overlap, the first boundary region 116a of the first non-coating portion 116, and on, e.g., to overlap, the second boundary region 126a of the second non-coating portion 126.

If any one of the fixing members 140 is disposed on the first active material coating portion 114 (or the first active material coating portion 124), the first active material (or the second active material) applied to the first metal collector 112 (or the second metal collector 122) may adhere to a surface of the fixing member 140 and separate from the first metal collector 112 (or the second metal collector 122). In this case, the fixing member 140 may separate from the first metal collector 112 (or the second metal collector 122), so that the fixing member 140 cannot fix the first electrode plate 110 (or the second electrode plate 120) to the separator 130.

In the embodiment, however, the fixing members 140 are disposed on the first and second non-coating portions 116 and 126 of the first and second electrode plates 110 and 120. Thus, the first and second electrode plates 110 and 120 and the separator 130 may be fixed at one end by the fixing members 140, and a case where the end portions of the first and second electrode plates 110 and 120 and the separator 130 are not fixed due to separation of an active material may not arise.

The fixing members 140 of the embodiment are described above as being formed of an adhesive or tape coated with an adhesive. However, embodiments are not limited thereto.

Referring to FIGS. 1 and 3-4, the first electrode tab 118 and the second electrode tab 128 extend from an end portion of the electrode assembly 100 in the first direction, e.g., along the y-axis. For example, the first electrode tab 118 and the second electrode tab 128 may respectively be attached to and electrically connected to the first non-coating portions 116 and the second non-coating portions 126 of the stack by, e.g., a welding method. For example, the first electrode tab 118 may be attached and connected to the first connection regions 116b of the first non-coating portions 116, and the second electrode tab 128 may be attached and connected to the second boundary regions 126b of the second non-coating portions 126. In FIGS. 3 and 4, points denoted by "w" are welding points.

Referring to FIGS. 1 and 4-6, the molding member 200 may surround at least a connection region (or an attachment region) between the first and second electrode tabs 118 and 128 and the first and second non-coating portions 116 and 126, and a portion of the electrode assembly 100 in which the fixing members 140 are formed. The molding member 200 may prevent disconnection between the first and second electrode tabs 118 and 128 and the first and second non-coating portions 116 and 126 or cutting-off of the first and second non-coating portions 116 and 126. For example, as illustrated in FIG. 6, the molding member 200 may be conformally wrapped around exposed surfaces of the connection region between the first and second electrode tabs 118 and 128 and the corresponding first and second non-coating portions 116 and 126, and may further, e.g., continuously, extend along portions of the first and second boundary regions 116a 126a to prevent disconnection between the first and second electrode tabs 118 and 128 and the corresponding first and second non-coating portions 116 and 126

In contrast, in a flexible secondary battery without the molding member 200, which may be repeatedly bent and unbent while being used for a long time through charging and recharging operations, stress caused by the repetitive bending and unbending for a long time may be concentrated on a portion of the electrode assembly that is relatively vulnerable to stress. As such, the vulnerable portion of the electrode assembly may be damaged or may break. For example, without the molding member 200, the first and second non-coating portions 116 and 126 (particularly, the first and second connection regions 116b and 126b of the first and second non-coating portions 116 and 126) that are weaker than the other portions of the stack may be cut, or the first and second electrode tabs 118 and 128 may separate from the first and second non-coating portions 116 and 126.

In the embodiment, however, the molding member 200 extends along and surrounds the end portion of the electrode assembly 100, in which the fixing members 140 are formed. Thus, the first and second non-coating portions 116 and 126, i.e., the first and second connection regions 116b and 126b of the first and second non-coating portions 116 and 126, may be restrained from moving relative to the first and second electrode plates 110 and 120. Therefore, the first and second non-coating portions 116 and 126 may not be cut despite repetitive bending and unbending. In addition, since connection portions (attachment portions) of the first and second electrode tabs 118 and 128 and the first and second non-coating portions 116 and 126 are fixed relative to each other by the molding member 200, the first and second electrode tabs 118 and 128 welded to the first and second non-coating portions 116 and 126 may not separate from the first and second non-coating portions 116 and 126.

The molding member 200 may have flexibility. When the electrode assembly 100 is bent, the molding member 200 may be bent together with the electrode assembly 100. Therefore, when the electrode assembly 100 is bent, stress may not concentrate on the electrode assembly 100 but may be distributed to the molding member 200. The molding member 200 may be formed of resin. For example, the molding member 200 may be formed of thermosetting resin, UV-curable resin, or IR-curable resin.

Referring back to FIG. 1, the gasket 300 may surround edges of the electrode assembly 100, and may have a frame shape having opened first and second surfaces. The first sealing sheet 410 may be attached to the first surface of the gasket 300, and the second sealing sheet 420 may be attached to the second surface of the gasket 300 that is opposite the first surface. The first and second sealing sheets 410 and 420 may seal the electrode assembly 100 together with the gasket 300.

A space is formed in the gasket 300 to accommodate the electrode assembly 100. The electrode assembly 100 of which an end portion is surrounded by the molding member 200 may be disposed in the gasket 300, and the first and second electrode tabs 118 and 128 may extend outward from the gasket 300 in the first direction.

The gasket 300 may be formed of a flexible material. For example, the gasket 300 may be formed of the same material as that used to form first insulation layers of the first and second sealing sheets 410 and 420. As described above, if the gasket 300 is formed of a flexible material, when the electrode assembly 100 is bent, the gasket 300 may be bent together with the electrode assembly 100. Therefore, when the electrode assembly 100 is bent, stress may not concentrate on the electrode assembly 100 but may be distributed to the gasket 300, thereby preventing the electrode assembly 100 from being damaged.

Each of the first and second sealing sheets 410 and 420 may include a first insulation layer, a metal layer, and a second insulation layer that are sequentially stacked. The first and second insulation layers may be formed of, e.g., polypropylene (PP), polyethylene terephthalate (PET), or nylon, and the metal layer may be, e.g., aluminum, steel, or stainless steel. However, the first and second insulation layers and the metal layer are not limited thereto.

For example, each of the first and second sealing sheets 410 and 420 may have a three-layer structure made up of a first insulation layer formed of PP, a metal layer formed of aluminum, and a second insulation layer formed of PET. The first insulation layers of the first and second sealing sheets 410 and 420 may contact the gasket 300.

The first insulation layers may be attached to the gasket 300 by thermal fusing. In this case, for example, the gasket 300 may be formed of the same material as that used to form the first insulation layers for improving the thermal fusing efficiency and the coupling strength between the first insulation layers and the gasket 300.

The first and second electrode tabs 118 and 128 of the electrode assembly 100 may extend between the gasket 300 and the first sealing sheet 410 to the outside, and insulation films 150 may be attached to outer-surface regions of the first and second electrode tabs 118 and 128 overlapped with the gasket 300 for improving the coupling strength of the first and second electrode tabs 118 and 128 to the gasket 300 and the first sealing sheet 410 and preventing a short circuit between the first and second electrode tabs 118 and 128.

In the current embodiment, the first and second electrode tabs 118 and 128 extend to the outside through a region between the gasket 300 and the first sealing sheet 410. However, the embodiments are not limited thereto. In another embodiment, the first and second electrode tabs 118 and 128 may extend to the outside through the gasket 300.

As described above, according to the one or more of the above embodiments, the flexible secondary battery may be stable even when repeatedly bent.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible secondary battery, comprising:
   an electrode assembly including:
      a stack having a first electrode plate, a second electrode plate, and a separator between the first and second electrode plates, and
      a fixing member fixing a first end portion of the stack;
   a first electrode tab and a second electrode tab connected to the first electrode plate and the second electrode plate, respectively; and
   a molding member surrounding a first end portion of the electrode assembly including the fixing member, and a connection region between the electrode assembly and the first and second electrode tabs,
   wherein positional variations of a second end portion of the electrode assembly are relatively large as compared to positional variations of the first end portion of the electrode assembly, such that, when the electrode assembly is bent, a distance between terminal edges of two outermost layers in the second end portion of the electrode assembly is different from a distance between terminal edges of two outermost layers in the first end portion of the electrode assembly.

2. The flexible secondary battery as claimed in claim 1, wherein the molding member is flexible.

3. The flexible secondary battery as claimed in claim 1, wherein the molding member includes a resin.

4. The flexible secondary battery as claimed in claim 1, further comprising:
   a gasket surrounding edges of the electrode assembly and having open first and second surfaces;
   a first sealing sheet attached to the first surface of the gasket; and
   a second sealing sheet attached to the second surface of the gasket that is opposite the first surface.

5. The flexible secondary battery as claimed in claim 4, wherein:
   each of the first and second sealing sheets includes a first insulation layer, a metal layer, and a second insulation layer, and
   the first insulation layers contact the gasket, the gasket and the first insulation layers including a same material.

6. The flexible secondary battery as claimed in claim 4, wherein the molding member is disposed in the gasket.

7. The flexible secondary battery as claimed in claim 1, wherein the fixing member is adjacent to the first and second electrode tabs.

8. The flexible secondary battery as claimed in claim 1, wherein:
   the first electrode plate includes a first active material coating portion, which has a first active material on a first metal collector, and a first non-coating portion, which has no first active material on the first metal collector, the first electrode tab being attached to the first non-coating portion, and
   the second electrode plate includes a second active material coating portion, which has a second active material on a second metal collector with, and a second non-coating portion, which has no second active material on the second metal collector, the second electrode tab being attached to the second non-coating portion.

9. The flexible secondary battery as claimed in claim 8, wherein:
   the first non-coating portion includes a first connection region, to which the first electrode tab is attached, and a first boundary region, on which the fixing member is disposed, and
   the second non-coating portion includes a second connection region, to which the second electrode tab is attached, and a second boundary region, on which the fixing member is disposed.

10. The flexible secondary battery as claimed in claim 1, wherein the first and second electrode tabs extend in a same direction.

11. The flexible secondary battery as claimed in claim 1, wherein the fixing member, the first electrode tab, and the second electrode tab are at a same side of the electrode assembly.

12. The flexible secondary battery as claimed in claim 11, wherein the molding member continuously overlaps the fixing member, the first electrode tab, and the second electrode tab.

13. The flexible secondary battery as claimed in claim 11, wherein the molding member and the fixing member are at a same side of the electrode assembly.

14. The flexible secondary battery as claimed in claim 11, wherein the fixing member, the first electrode tab, and the second electrode tab are only at a single side of the electrode assembly.

15. The flexible secondary battery as claimed in claim 1, wherein the molding member continuously overlaps the fixing member and a contact region between the first and second electrode tabs and corresponding portions of the electrode assembly.

16. The flexible secondary battery as claimed in claim 1, wherein edges of the first electrode plate, the second electrode plate, and the separator in the first end portion of the stack are stationary within the electrode assembly, and edges of the first electrode plate, the second electrode plate, and the separator in a second end portion of the stack are moveable within the electrode assembly when the secondary battery is bent, the first and second end portions of the stack being opposite each other.

17. The flexible secondary battery as claimed in claim 1, wherein edges of the first electrode plate, the second electrode plate, and the separator in a second end portion of the stack are spaced apart from each other within the electrode assembly when the secondary battery is bent, while edges of the first electrode plate, the second electrode plate, and the separator in the first end portion of the stack are maintained aligned and fixed when the secondary battery is bent, the first and second end portions of the stack being opposite each other.

18. The flexible secondary battery as claimed in claim 1, wherein, when the electrode assembly is bent, terminal edges of layers in the second end portion of the electrode assembly are spaced apart from each other.

19. The flexible secondary battery as claimed in claim 18, wherein, when the electrode assembly is bent, the terminal edges of layers in the second end portion of the electrode assembly are slidable against each other.

20. The flexible secondary battery as claimed in claim 1, wherein the fixing member includes a first fixing member and a second fixing member parallel to each other, the first fixing member being between and coupling the first electrode plate and the separator in the first end portion of the stack, and the second fixing member being between and coupling the second electrode plate and the separator in the first end portion of the stack.

* * * * *